US012683346B2

(12) United States Patent
Viault

(10) Patent No.: US 12,683,346 B2
(45) Date of Patent: Jul. 14, 2026

(54) GROUNDING BRUSH ASSEMBLY WITH IMPROVED ELECTRICAL CONDUCTIVITY PROPERTIES

(71) Applicant: Aktiebolaget SKF, Gothenburg (SE)

(72) Inventor: Samuel Viault, Saint-Antoine-du-Rocher (FR)

(73) Assignee: Aktiebolaget, SKF, Gothenburg (SE)

(*) Notice: Subject to any disclaimer, the term of this patent is extended or adjusted under 35 U.S.C. 154(b) by 533 days.

(21) Appl. No.: 17/981,396

(22) Filed: Nov. 5, 2022

(65) Prior Publication Data

US 2023/0170658 A1 Jun. 1, 2023

(30) Foreign Application Priority Data

Dec. 1, 2021 (DE) ......................... 102021213639.7

(51) Int. Cl.
*H01R 39/38* (2006.01)
*H01R 39/39* (2006.01)

(52) U.S. Cl.
CPC ........... *H01R 39/388* (2013.01); *H01R 39/39* (2013.01)

(58) Field of Classification Search
CPC .............................. H01R 39/388; H01R 39/39
See application file for complete search history.

(56) References Cited

U.S. PATENT DOCUMENTS 6,490,150 B1 * 12/2002 Theisen ................... H01H 9/12 361/652
2011/0216466 A1 * 9/2011 Oh ......................... H02K 11/40 361/221
2019/0036256 A1 * 1/2019 Martens ............... H01R 13/658
2019/0296617 A1 * 9/2019 Hubert ................... H01R 39/64

* cited by examiner

*Primary Examiner* — Scott Bauer
(74) *Attorney, Agent, or Firm* — Stinson LLP

(57) ABSTRACT

A grounding brush assembly including a grounding brush and a mounting plate configured to axially and radially retain the brush, the brush providing a support and a plurality of electrically conductive fibers mounted in the support. The mounting plate is at least partially coated with an electrically conductive coating.

10 Claims, 3 Drawing Sheets

GROUNDING BRUSH ASSEMBLY WITH IMPROVED ELECTRICAL CONDUCTIVITY PROPERTIES

CROSS-REFERENCE TO RELATED APPLICATIONS

This application claims priority to German Patent Application no. 102021213639.7, filed Dec. 1, 2021, the contents of which is fully incorporated herein by reference.

TECHNICAL FIELD OF THE INVENTION

The present invention generally relates to grounding devices for controlling shaft current generated in electric motors or machines and in particular to grounding brush assemblies.

In particular, the present invention concerns the electrical conductivity of grounding brush assemblies and, more particularly, a grounding brush assembly having improved electrical conductivity properties.

BACKGROUND OF THE INVENTION

Typically, in an electric motor or machine, a rolling bearing is mounted between a motor housing and a rotating shaft to support the shaft.

When the shaft is rotating, an electrical potential difference may occur between the shaft and the electric motor housing, which generates an electrical potential between the inner ring and the outer ring of the rolling bearing.

The current flowing through the rolling bearing can damage the components of the bearing, especially the raceways of the inner and outer rings and rolling elements. Electrical discharges can also generate vibrations and increase the noise level of the motor.

Consequently, it is desirable to electrically ground the rotating shaft.

In order to overcome these disadvantages, it is known to ground or earth the rotating shaft using a grounding brush with conductive fibers.

The grounding brush is usually mounted on an electric motor housing so that the distal ends of the fibers are in radial contact with the rotating shaft. Due to the conductivity of the fibers, the brush is maintained at the same electrical potential as the electric motor housing. The inner and outer rings of the rolling bearing are also at the same electrical potential, which reduces or eliminates problematic electrical discharges through the rolling bearing.

A known grounding brush assembly includes a mounting plate, also called adaptor, configured to axially and radially retain the grounding brush. The grounding brush comprises a support usually made of sheet material such as steel or aluminum, and a plurality of carbon fibers mounted in the support.

However, despite the presence of such a grounding brush assembly in an electric machine, damage such as craters can be observed on the rolling bearing raceways after a short period of use.

Consequently, the present invention intends to overcome these disadvantages by providing a grounding brush assembly that allows a better protection to rolling bearings against current leakage.

SUMMARY OF THE INVENTION

One object of the invention is to provide a grounding brush assembly comprising a grounding brush and a mounting plate configured to axially and radially retain the brush, the brush comprising a support and a plurality of electrically conductive fibers mounted in the support.

Besides, the mounting plate is at least partially coated with an electrically conductive coating.

Preferably, the support is at least partially coated with an electrically conductive coating.

Preferably, the electrical conductivity of the electrically conductive coating is equal or greater than $50\times10^6$ Siemens/m, more preferably equal or greater than $62.1\times10^6$ Siemens/m.

Advantageously, the electrically conductive coating may comprise a nickel-based material or a silver-based material.

According to an embodiment, the electrically conductive coating can be made of pure silver.

Preferably, the thickness of the electrically conductive coating made of pure silver is comprised between 5 and 10 μm.

According to another embodiment, the electrically conductive coating can comprise nickel sulfamate.

Preferably, the thickness of the electrically conductive coating comprising nickel sulfamate is comprised between 5 to 15 μm.

Advantageously, the mounting plate can be made of steel or aluminum.

Advantageously, the support can be made of steel or aluminum.

According to an embodiment, both the mounting plate and the support can be made of steel or aluminum.

Advantageously, the mounting plate may comprise a main body and a plurality of holding lugs fully coated by the electrically conductive coating.

Advantageously, the support may comprise an axial portion and two lateral portions fully coated by the electrically conductive coating.

The invention also concerns an electrical machine comprising a housing, a shaft and at least one grounding brush assembly as described above radially mounted between the housing and the shaft and in radial contact with the shaft.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiments of the invention, which are non-limiting example, illustrated on the appended drawings of which.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty)(20° degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In what follows, the bounds of a value domain are included in this domain, especially in the expression "comprised between".

Figure 1:
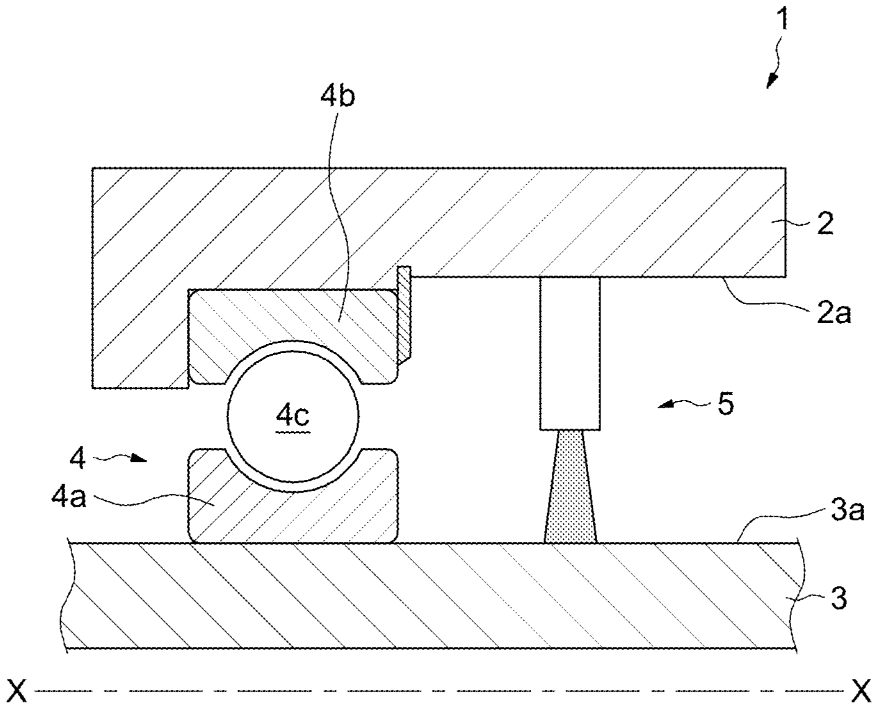
FIG. 1 is an axial cross-sectional view of a grounding brush assembly according to an embodiment of the invention radially mounted between a rotating shaft and an electric motor housing.

FIG. 1 shows, in axial section, part of a motor or electric machine 1 comprising a stationary housing 2 and a rotating shaft 3, of axis X-X, radially supported by a rolling bearing 4.

According to an embodiment, the motor 1 is an electric of hybrid vehicle motor.

The motor 1 further comprises a grounding brush assembly 5 mounted radially between a bore 2*a* of the housing 2 and an outer cylindrical surface 3*a* of the rotating shaft 3.

The grounding brush assembly 5 continuously dissipates the electrical charges that accumulate on the motor shaft 3 during operation of the motor 1 by transferring them to the housing 2.

Alternatively, the grounding brush assembly 5 could be provided to continuously dissipate electrical charges that accumulate in the housing 2 by transferring them to the shaft 3.

According to an embodiment, the motor 1 can be provided with a plurality of rolling bearing 4.

According to an embodiment, the motor 1 can be provided with a plurality of grounding brush assemblies 5.

The illustrated rolling bearing 4 comprises an inner ring 4*a*, secured to the cylindrical outer surface 3*a* of the shaft 3, an outer ring 4*b* mounted in the bore 2*a* of the housing 2 and a plurality of rolling elements 4*c* arranged radially between raceways formed on the inner and outer rings 4*a* and 4*b*.

The illustrated rolling elements 4*c* are here balls. Alternatively, other types of rolling elements could be provided, such as cylindrical or conical rollers, needles, etc.

Alternatively, a rolling bearing such as a plain bearing type could be provided.

In the illustrated example, the outer ring 4*b* of the rolling bearing 4 and the housing 2 are two separate elements. Alternatively, it could be provided that the outer ring 4*b* of the rolling bearing may be a part of the motor housing 2.

The grounding brush assembly 5 has a generally annular shape, arranged radially around the shaft 3.

Figure 2:
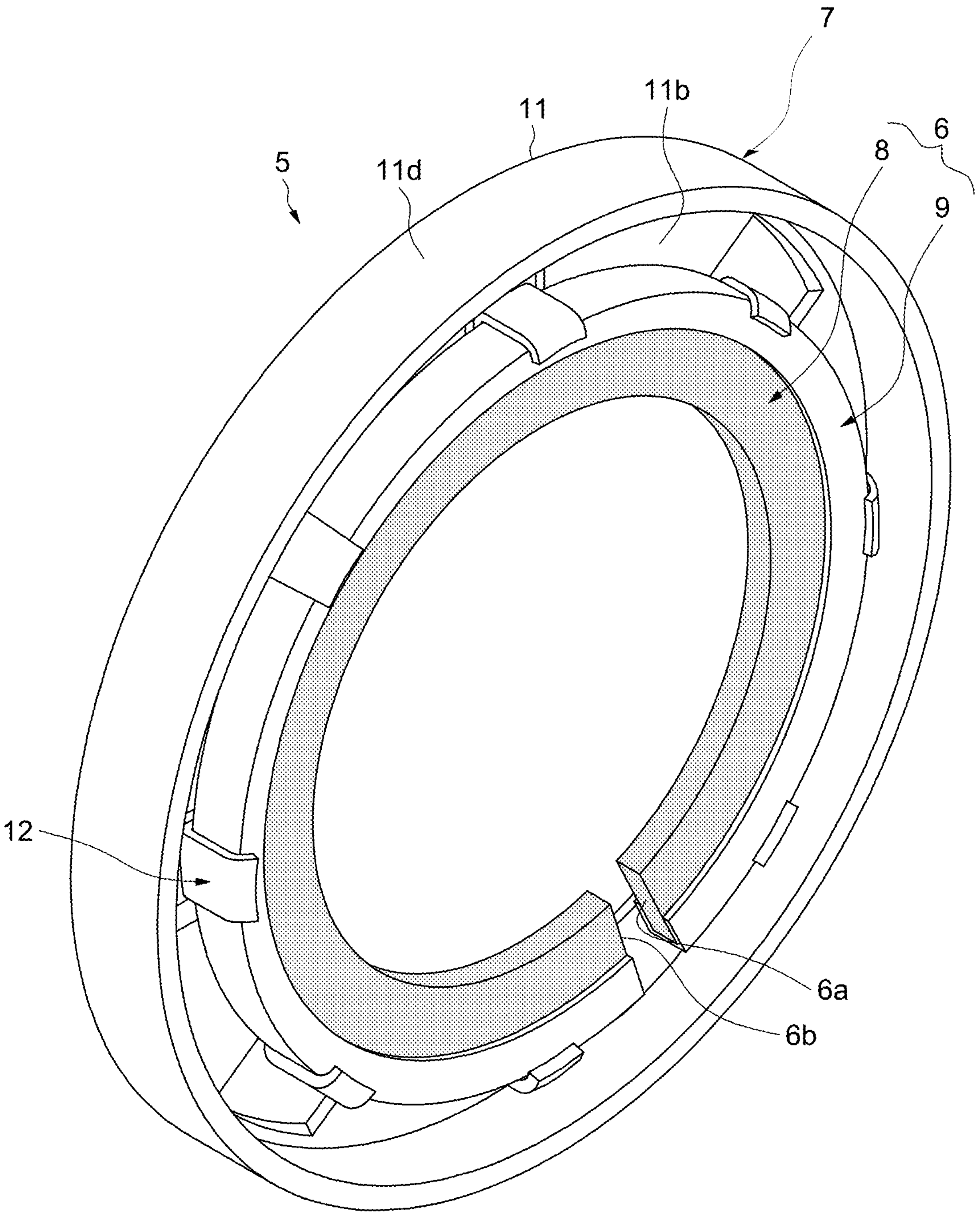
FIG. 2 is a perspective view of a grounding brush assembly according to an embodiment of the invention.
Figure 3:
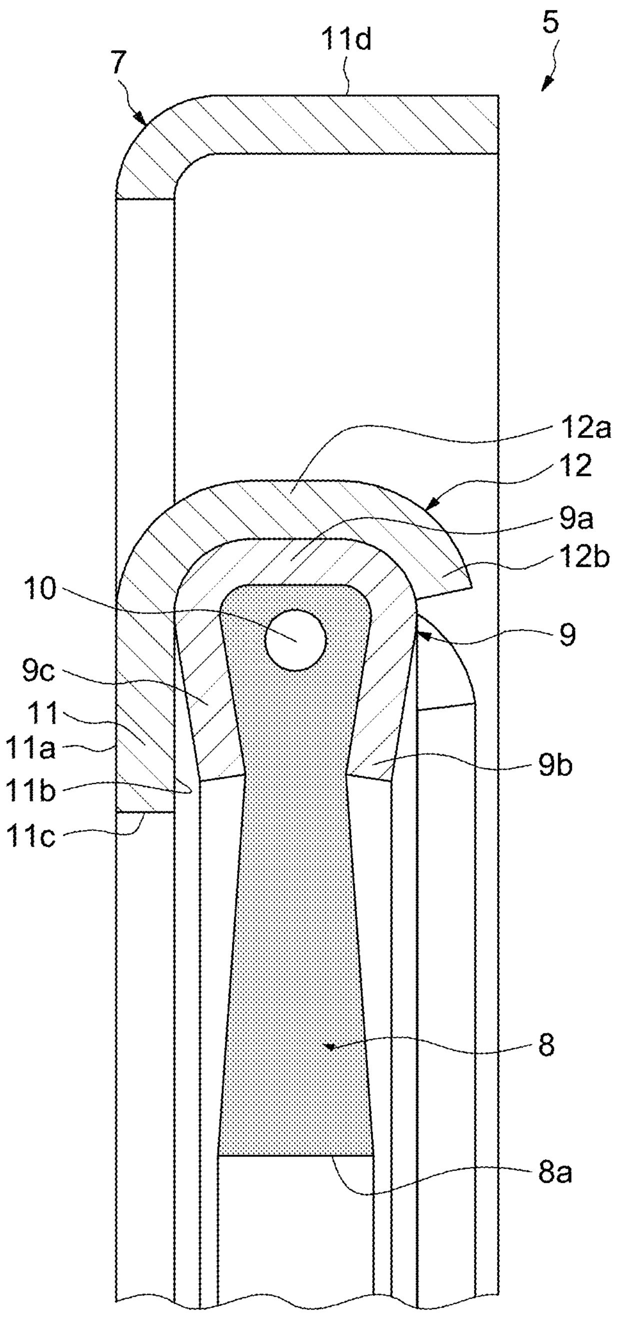
FIG. 3 is a cross-sectional view of the grounding brush assembly illustrated in FIG. 2.

As illustrated in detail in FIGS. 2 and 3, the grounding brush assembly 5 includes a grounding brush 6 and a mounting plate 7 configured to axially and radially retain the brush 6.

The brush 6 includes a plurality of individual electrically conductive fibers 8 arranged circumferentially about the shaft 3.

Preferably, the conductive fibers 8 are made of carbon which exhibits a very low electrical resistance.

In another embodiment, the conductive fibers 8 can be made of stainless steel or conductive plastics, such as acrylic fibers or nylon.

The brush 6 further comprises a substantially annular holder or support 9, in which the conductive fibers 8 are mounted.

The support 9 comprises an axial portion 9*a* and two lateral portions 9*b*, 9*c* extending radially inwardly to axially clamp the conductive fibers 8. The axial portion 9*a* and the two lateral portions 9*b*, 9*c* define a channel having, in cross-section, a U-shape in which one end of the conductive fibers 8 is located.

In the illustrated example, and in a non-limiting manner, the lateral portions 9*b*, 9*c* extend in a substantially inclined direction.

As can be seen in FIG. 3, the conductive fibers 8 may be bent around a bonding wire 10.

The free distal end 8*a* of the conductive fibers 8 is in radial contact with the outer surface 3*a* of the shaft 3.

In the illustrated example, the grounding brush 6 is in the form of an open ring comprising a first end 6*a* circumferentially spaced from a second end 6*b*, as seen in FIG. 2.

Such a circumferential spacing between two ends of the brush 6 allows the brush to accommodate different diameters of the shaft 3.

Alternatively, the first end 6*a* of the brush 6 and the second end 6*b* may be attached to each other.

The mounting plate 7 of the brush 6 may comprise an annular radial main body 11 delimited axially by a first front face 11*a* and a second front face 11*b*, and radially by a bore 11*c* and an outer surface 11*d*.

The mounting plate 7 further comprises a plurality of holding lugs 12 extending axially from the second front face 11*b* of the main body 11.

The holding lugs 12 allow the grounding brush 6 to be axially and radially retained.

Each holding lugs 12 includes an axial portion 12*a* extending axially from the second front face 11*d* and a lip or retaining bracket 12*b* extending from one end of the axial portion 12*a*, on the opposite side of the main body 11, radially inwardly. The retaining bracket 12*b* is intended to axially retain the grounding brush 6. The retaining bracket 12*b* is preferably in contact with one of the lateral portions 9*b* of the support 9.

The support 9 of the grounding brush 6 is held axially in abutment against the second front face 11*b* of the main body 11 of the mounting plate 7.

The axial portion 12*a* of each holding lug 12 locally radially surrounds the support 9 and is in radial contact with the axial portion 9*a* of the support 9.

As illustrated in FIG. 2, the axial holding lugs 12 are evenly distributed around the circumference of the main body 11 and are circumferentially spaced from each other.

As illustrated, the number of holding lugs 12 is equal to eight. Alternatively, a different number of holding lugs 12 could be provided, such as three or more.

The mounting plate 7 is made of a conductive material, preferably aluminum having a high electrical conductivity of $36.9\times10^6$ Siemens/m.

Alternatively, the mounting plate 7 may be made of steel, for example stainless steel.

The support 9 is also made of a conductive material, preferably aluminum.

Alternatively, the support 9 may be made of steel, for example stainless steel.

The mounting plate 7 is at least partially coated with an electrically conductive coating.

In order to exhibit better electrical conductivity properties, the mounting plate 7 is preferably fully coated by the electrically conductive coating. In other words, the electrically conductive coating covers the whole surface of the main body 11 and the whole surface of the plurality of holding lugs 12.

In an embodiment, the support 9 is also coated at least partially with an electrically conductive coating.

Preferably, the support 9 is fully coated by the electrically conductive coating. In other words, the coating covers the whole surface of the support 9 including the axial portion 9*a* and both lateral portions 9*b*, 9*c*.

Preferably, the electrical conductivity of the electrically conductive coating is equal or greater than $50\times10^6$ Siemens/m and, more preferably equal or greater than $62.1\times10^6$ Siemens/m.

According to an embodiment, the electrically conductive coating may comprise a silver-based material.

In the present invention, a silver-based material is defined as a material having a total silver content, expressed in terms of percentage by weight, greater than other elements content.

According to an embodiment, the electrically conductive coating can be made of pure silver.

In the present invention, a pure silver material is defined as a material having a total silver content, expressed in terms of percentage by weight, equal or superior to 98 weight percent.

The pure silver can be applied by silver plating.

The thickness of the electrically conductive coating comprising pure silver is preferably comprised between 5 μm and 10 μm.

The electrically conductive coating comprising pure silver exhibits a very high electrical conductivity of $62.1\times10^6$ Siemens/m.

According to another embodiment, the electrically conductive coating may comprise a nickel-based material.

In the present invention, a nickel-based material is defined as a material having a total nickel content, expressed in terms of percentage by weight, greater than other elements content.

Advantageously, the electrically conductive coating can comprise nickel sulfamate of molecular formula $Ni(SO_3NH_2)_2$.

Nickel sulfamate exhibits an electrical conductivity of nearly $7\times10^2$ Siemens/m to $1\times10^3$ Siemens/m.

In an embodiment, the electrically conductive coating may contain exclusively nickel sulfamate.

The nickel sulfamate can be applied by nickel electroplating.

The thickness of the electrically conductive coating comprising nickel sulfamate is preferably comprised between 5 μm to 15 μm.

According to an embodiment, the mounting plate 7 can comprise a first electrically conductive coating comprising nickel sulfamate and a second electrically conductive coating comprising pure silver applied on the first electrically conductive coating.

According to an embodiment, the mounting plate 7 and the support 9 are made with a similar material and coated with a similar electrically conductive coating.

The application of the electrically conductive coating is a simple way allowing to reduce the electrical resistance of the grounding brush assembly 5 which ensures, consequently, a better protection to rolling bearings 4 against current leakage.

The invention claimed is:

1. An electrical machine comprising:

at least one grounding brush assembly, comprising:

a grounding brush, and a mounting plate configured to axially and radially retain the brush, the brush comprising a support and a plurality of electrically conductive fibers mounted in the support, wherein the mounting plate is at least partially coated with an electrically conductive coating;

a housing, and a shaft, the electrically conductive fibers being bent about a bonding wire and secured such that ends of the electrically conductive wire are in contact with the shaft, wherein the housing and the shaft form a chamber in which a bearing having an outer ring is located, the at least one grounding brush assembly also being located in the chamber such that the mounting plate is located on a portion of the housing that is located radially farther from the shaft than a radially outermost surface of the outer ring, the at least one grounding brush assembly is mounted radially between the housing and the shaft and is in radial contact with the shaft, and wherein a radially outermost end of the at least one grounding brush assembly contacts the housing.

2. The electrical machine according to claim 1, wherein the support is at least partially coated with an electrically conductive coating.

3. The electrical machine according to claim 1, wherein the electrical conductivity of the electrically conductive coating is equal or greater than $50\times10^6$ Siemens/m.

4. The electrical machine according to claim 1, wherein the electrically conductive coating comprises a nickel-based material or a silver-based material.

5. The electrical machine according to claim 4, wherein the electrically conductive coating is made of pure silver.

6. The electrical machine according to claim 4, wherein the electrically conductive coating comprises nickel sulfamate.

7. The electrical machine according to claim 1, wherein the mounting plate and/or the support are made of steel or aluminum.

8. The electrical machine according to claim 1, wherein the mounting plate comprises a main body and a plurality of holding lugs fully coated by the electrically conductive coating.

9. The electrical machine according to claim 1, wherein the support comprises an axial portion and two lateral portions fully coated by the electrically conductive coating.

10. The electrical machine according to claim 3, wherein the electrical conductivity of the electrically conductive coating is preferably equal or greater than $62.1\times10^6$ Siemens/m.

* * * * *